US009869759B2

(12) United States Patent
Furuskog et al.

(10) Patent No.: US 9,869,759 B2
(45) Date of Patent: Jan. 16, 2018

(54) MOTION DETECTOR DEVICE

(75) Inventors: Johan Furuskog, Stockholm (SE); Jonas Medbo, Uppsala (SE); Markus Ringström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 572 days.

(21) Appl. No.: 14/352,967

(22) PCT Filed: Oct. 19, 2011

(86) PCT No.: PCT/EP2011/068228
§ 371 (c)(1),
(2), (4) Date: Apr. 18, 2014

(87) PCT Pub. No.: WO2013/056731
PCT Pub. Date: Apr. 25, 2013

(65) Prior Publication Data
US 2014/0247179 A1    Sep. 4, 2014

(51) Int. Cl.
*G01S 13/56* (2006.01)
*G01S 13/04* (2006.01)
(Continued)

(52) U.S. Cl.
CPC .............. *G01S 13/04* (2013.01); *G01S 11/02* (2013.01); *G01S 13/003* (2013.01); *H04W 64/006* (2013.01)

(58) Field of Classification Search
CPC ..................................................... G01S 13/04
(Continued)

(56) References Cited

U.S. PATENT DOCUMENTS 8,723,721 B2 * 5/2014 Moruzzis ................ G01S 7/003
342/118
9,008,584 B2 * 4/2015 Alexander ............ G01S 13/003
340/552
(Continued)

FOREIGN PATENT DOCUMENTS

WO        2009128002 A1    10/2009
WO    WO 2009128002 A1 * 10/2009 ........... G01S 13/003

OTHER PUBLICATIONS

Nishi et al. "Indoor Human Detection Systems Using VHF-FM and UHF-TV Broadcasting Waves" IEEE, 2006, 5 pages.
(Continued)

*Primary Examiner* — Marcus E Windrich
(74) *Attorney, Agent, or Firm* — Rothwell, Figg, Ernst & Manbeck, p.c.

(57) ABSTRACT

The present invention relates to a motion detector device comprising a receiver arranged for reception of at least one electromagnetic signal constituted by a corresponding transmitted electromagnetic signal being transmitted by a corresponding source and influenced by a corresponding channel. The motion detector device comprises predetermined information regarding each transmitted electromagnetic signal. The motion detector device further comprises analyzing means arranged to analyze all components of the received signal to determine how certain parameters of each transmitted electromagnetic signal are influenced by each corresponding channel by means of the predetermined information. The analyzing means is also arranged to analyze the temporal variation of said certain parameters during a certain time. It is determined if said temporal variation exceeds a predetermined threshold.
The present invention also relates to a corresponding method.

20 Claims, 6 Drawing Sheets

(51) Int. Cl.
*G01S 13/00* (2006.01)
*H04W 64/00* (2009.01)
*G01S 11/02* (2010.01)

(58) Field of Classification Search
USPC .................................................... 342/27–28
See application file for complete search history.

(56) References Cited

U.S. PATENT DOCUMENTS

| | | | | |
|---|---|---|---|---|
| 2004/0246177 | A1* | 12/2004 | Lloyd | G01S 13/003 342/453 |
| 2005/0285787 | A1* | 12/2005 | Delaveau | G01S 7/352 342/387 |
| 2008/0018521 | A1* | 1/2008 | Sahinoglu | G01S 7/28 342/27 |
| 2010/0207804 | A1* | 8/2010 | Hayward | G01S 7/414 342/28 |
| 2011/0148689 | A1* | 6/2011 | Filippi | G01S 13/003 342/28 |

OTHER PUBLICATIONS

Official Action dated Sep. 21, 2015, in connection with Russian Patent Application No. 2014119921, 7 pages.
Office Action issued in Chinese Application No. 201180074236.4 dated May 2, 2017, 7 pages (14 pages with machine translation).
Search Report issued in Chinese Application No. 201180074236.4 dated Apr. 12, 2017, 2 pages.

\* cited by examiner

MOTION DETECTOR DEVICE

CROSS REFERENCE TO RELATED APPLICATION(S)

This application is a 35 U.S.C. §371 National Phase Entry Application from PCT/EP2011/068228, filed Oct. 19, 2011, designating the United States, the disclosure of which is incorporated herein in its entirety by reference.

TECHNICAL FIELD

The present invention relates to a motion detector device comprising a receiver arranged for reception of at least one electromagnetic signal. Each received electromagnetic signal is constituted by a transmitted electromagnetic signal influenced by a corresponding channel. Each transmitted electromagnetic signal is transmitted by a corresponding source, where the motion detector device comprises predetermined information regarding each transmitted electromagnetic signal.

The present invention relates to a method for detection of motion, the method comprising the step of receiving at least one electromagnetic signal. Each received electromagnetic signal is constituted by a transmitted electromagnetic signal influenced by a corresponding channel. Each transmitted electromagnetic signal is transmitted by a corresponding source.

BACKGROUND

Passive radar technology is used for detection of motion and positioning of targets by analyzing how transmitted signals from third party radio signal sources change over time. The third party radio signal sources may for example be constituted by broadcasting of television and radio, wireless communication networks such as for example GSM.

WO2009/128002 discloses a passive detector for determining presence or motion in an environment. The detector includes a receiver with a channel estimation module configured to determine a best channel to be monitored. A monitor is configured to measure fluctuations in the best channel However, there is still a need for a motion detector that improves the reliability of the detection process.

SUMMARY

It is an object of the present invention to provide a motion detector that improves the reliability of the detection process compared with prior art.

This object is obtained by means of a motion detector device comprising a receiver arranged for reception of at least one electromagnetic signal. Each received electromagnetic signal is constituted by a transmitted electromagnetic signal influenced by a corresponding channel. Each transmitted electromagnetic signal is transmitted by a corresponding source, where the motion detector device comprises predetermined information regarding each transmitted electromagnetic signal.

The motion detector device further comprises analyzing means arranged to analyze all components of the received signal to determine how certain parameters of each transmitted electromagnetic signal are influenced by each corresponding channel by means of the predetermined information. The analyzing means is also arranged to analyze the temporal variation of said certain parameters during a certain time. The motion detector device further comprises determining means arranged to determine if said temporal variation exceeds a predetermined threshold.

This object is obtained by means of a method for detection of motion, the method comprising the step of receiving at least one electromagnetic signal. Each received electromagnetic signal is constituted by a transmitted electromagnetic signal influenced by a corresponding channel. Each transmitted electromagnetic signal is transmitted by a corresponding source.

The method further comprises the steps:
Analyzing all components of the received signal to determine how certain parameters of each transmitted electromagnetic signal are influenced by each corresponding channel by means of predetermined information regarding each transmitted electromagnetic signal;
analyzing temporal variations of said certain parameters during a certain time; and
determining if said temporal variations exceed a predetermined threshold.

The method is performed using a motion detector device according to the above.

According to an example, the motion detector device can detect motion of surrounding objects and/or if the motion detector device itself is moved.

According to another example, the receiver is arranged for receiving at least two electromagnetic signals which have been transmitted by at least two spatially separated sources.

According to another example, the analyzing means is arranged to correlate temporal fluctuations of the channels resulting in received signals transmitted by at least two spatially separated sources. This enables the analyzing means to distinguish between surrounding objects closer to the motion detector device than any corresponding source, and surrounding objects closer to any corresponding source than the motion detector device.

According to another example, the analyzing means is arranged to form an average channel response for a number of channel responses during a certain time. The analysis of temporal variation of said certain parameters during a certain time comprises analysis of variations around the average channel response.

According to another example, the variations around the average channel response comprise variation of the amplitude of peaks and fades, and/or of the location of peaks and fades, in the instantaneous channel responses. These variations are comprised in said temporal variations.

According to another example, the analysis of temporal variation of said certain parameters during a certain time comprises analysis of Doppler shifts.

Other examples are evident from the dependent claims.

A number of advantages is provided by means of the present invention. For example:
The complete received signal is used, enabling detection of fluctuations where they are most evident; and
All types of signal fluctuations may be considered.

BRIEF DESCRIPTION OF THE DRAWINGS

The present invention will now be described more in detail with reference to the appended drawings, where.

DETAILED DESCRIPTION

Figure 1:
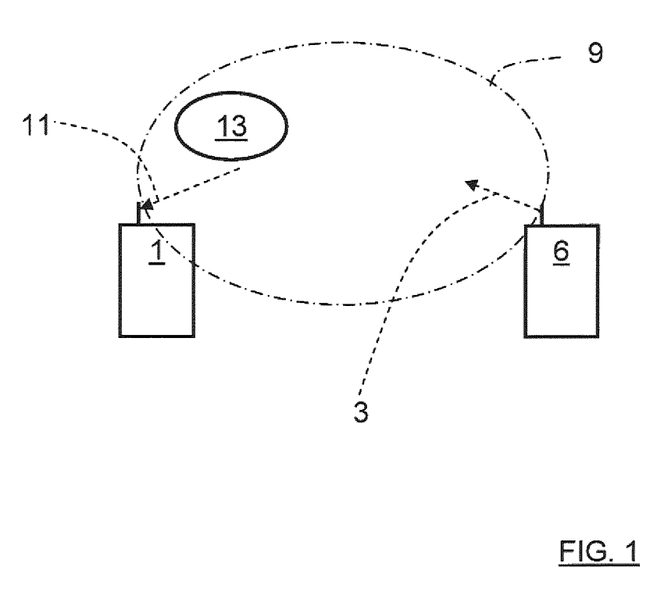
FIG. 1 shows a schematic view of a source and a motion detector.
Figure 3:
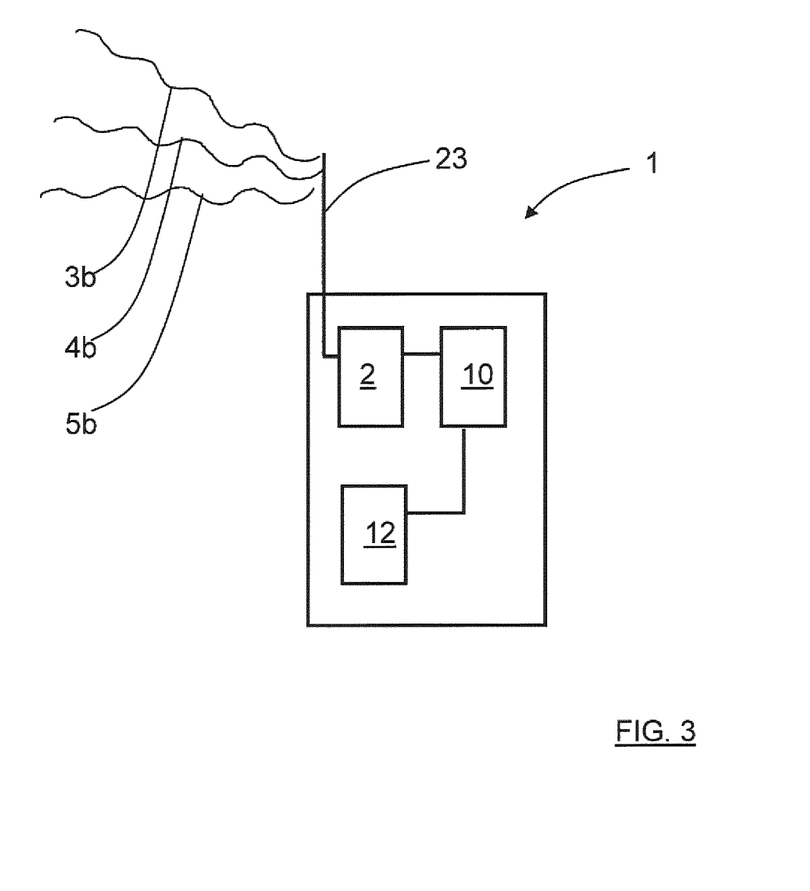
FIG. 3 shows a schematic view of a motion detector.

With reference to FIG. 1, a wireless communication signal source 6 transmits a signal 3 into a radio wave propagation environment 9, a so-called channel. With reference also to FIG. 3, a motion detector 1 comprises a receiving antenna 23 and a receiver 2, where the receiver 2 receives a received signal 11. The received signal 11 is constituted by the transmitted signal 3 and the influence of the channel 9, where this influence for example may be due to reflections in different objects comprised in the channel 9.

Given that the position of the receiver 2 relative the communication signal source 6 is constant, the stronger components of channel 9 normally change relatively slowly over time, but objects in the vicinity of the signal source 6 and/or the receiver 2 confer detectable changes of the received signal 11 due to fluctuations in the channel. If the motion detector 1 itself is moved, new channels will be present for each new position, which also will result in detectable changes of the received signal 11.

In a first example, the channel 9 comprises an object 13, where the object 13 affects the propagation properties of the channel 9 since the transmitted signal 3 will be reflected by the object 13, and thus the object 13 inflicts a difference between the transmitted signal 3 and the revived signal 11, which difference will change if the object 13 changes position. It should be noted that there probably are many more objects and properties of the channel 9 that inflict differences between the transmitted signal 3 and the revived signal 11, but as mentioned above, the difference inflicted by the object 13 will change if the object 13 changes position.

In a second example, the motion detector 1 itself is moved, which means that that more drastic changes will occur to the received signal 11 since the original channel will change to new channels for different positions of the motion detector 1 as it moves, new transmission paths being established continuously as the motion detector 1 moves.

For these two examples, the wireless communication signal source 6 is in the form of a base station, where the receiver 2 is arranged to detect predetermined information comprised in the received signal 11, this information being in the form of predetermined reference signals. These reference signals are known by the motion detector 1, data about these being stored in a memory in the motion detector 1, which allows the motion detector 1 to analyze the channel's influence of the transmitted signal by means of analyzing means 10 comprised in the motion detector 1.

According to the present invention, the analyzing means 10 is arranged to analyze all components of the received signal 11 to determine how certain parameters of the transmitted electromagnetic signal are influenced by the channel 9 by means of the predetermined information. The analyzing means 10 is also arranged to analyze the temporal variation of said certain parameters during a certain time, a number of examples of this will be discussed below.

Figure 4:
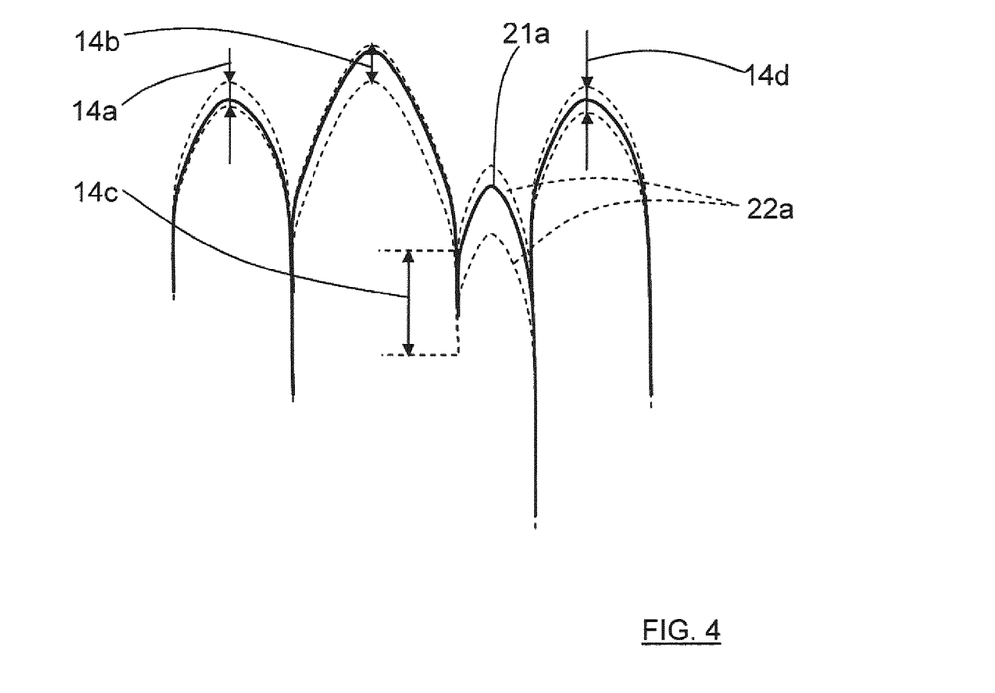
FIG. 4 shows a schematic view of a first type of fluctuations.
Figure 5:
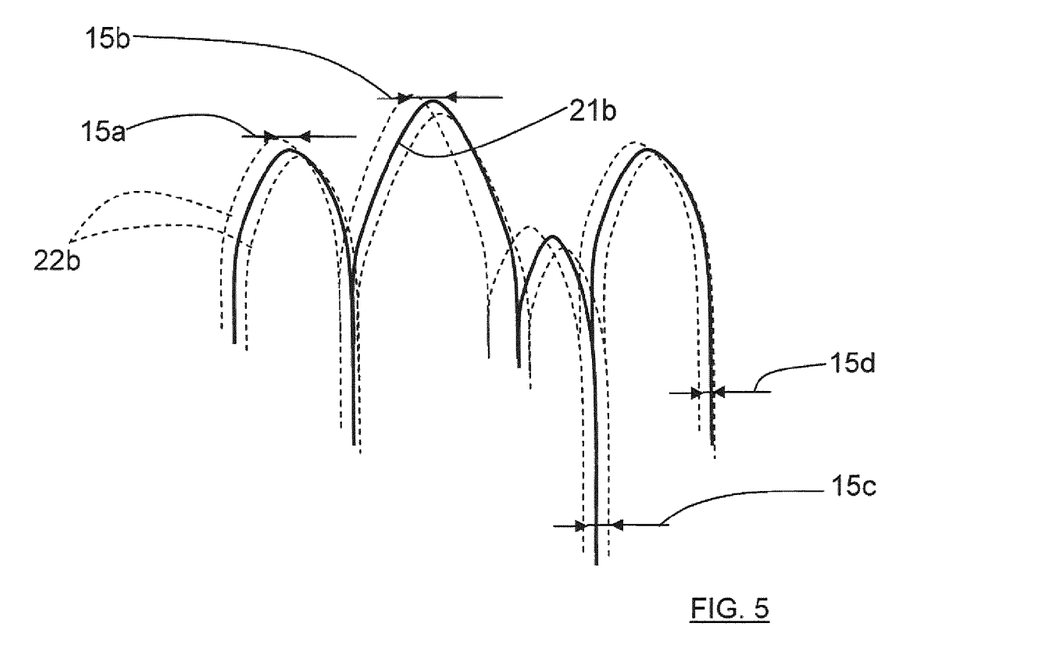
FIG. 5 shows a schematic view of a second type of fluctuations.

With reference to FIG. 4 and FIG. 5, in a first alternative of which certain parameters that are about to be analyzed, the analyzing means 10 is arranged to form an average complex channel frequency response 21a, 21b for a number of complex channel responses during a certain time. In this case, the analysis of temporal variation of said certain parameters during a certain time comprises analysis of variations 14a, 14b, 14c, 14d; 15a, 15b, 15c, 15d around the average complex channel response 21a, 21b.

With reference to FIG. 4, when detecting movement of an object 13 in the vicinity of the motion detector, the variations around the average complex channel response 21a comprise variation 14a, 14b, 14c, 14d of the amplitude and phase (not shown) of peaks and fades in the instantaneous channel responses 22a. This variation 14a, 14b, 14c, 14d is comprised in the more general term temporal variations. It is to be noted that the peaks and fades 14a, 14b, 14c, 14d indicated in FIG. 4 only are examples of these; the Figure itself comprises more peaks and fades which are not indicated for reasons of clarity.

With reference to FIG. 5, when detecting movement, the variations around the average complex channel response 21b comprise change 15a, 15b, 15c, 15d of the locations of peaks and fades as well as corresponding phases in the instantaneous channel responses 22b. This variation 15a, 15b, 15c, 15d is comprised in the more general to temporal variations.

Thus, generally, by comparing the long term average and instant received power, possibly as function of frequency, it is possible to detect if the motion detector is moving. If the motion detector itself is moving, the long term average channel changes. When the motion detector is stationary, in contrast, only small changes of the long term average channel occur. This is illustrated in FIG. 4 where the shape of the long term average channel is fixed as the motion detector is stationary whereas in FIG. 5 the locations of fades and peaks of the long term average are shifted, as the motion detector is moving. It is therefore possible to distinguish between motion of the motion detector 1 from physical activity, due to e.g. a person, in the vicinity of the motion detector 1. It is to be noted that the peaks and fades 15a, 15b, 15c, 15 indicated in FIG. 5 only are examples of these; the Figure itself comprises more peaks and fades which are not indicated for reasons of clarity.

A second alternative is to perform the above analysis for a corresponding complex channel impulse response, these parameters are in fact correlated since only a Fourier transform is needed in order to change between a complex channel frequency response and a complex channel impulse response. In general terms, these are referred to as complex channel response.

A third alternative is to detect Doppler shift instead. Here, in a well-known manner, a frequency shift inflicted to the transmitted signal 3 by the channel is changed, such that a Doppler spread is acquired.

In all examples and alternatives, the motion detector device 1 further comprises determining means 12 arranged to determine if said temporal variation exceeds a predetermined threshold. In that case, an alarm is triggered.

The motion detector may be constituted by a relatively uncomplicated device since it only needs to receive signals; no transmission capability is needed. Since no access to a radio network is required, no SIM (Subscriber Identity Module) or subscription charges apply.

Of course, an ordinary mobile terminal may be used as a motion detector, comprising the required functionality.

According to an example, a radio access network is arranged to communicate with a central, in order to trigger alarms, but other means are possible as well. The motion detector can for example trigger means of surveillance like cameras, possibly together with an alarm.

One example of application would be to leave a motion detector 1, in the form of a user terminal such as a mobile phone or a more uncomplicated device, inside a car. If somebody is breaking into the car, an early alarm is sent to the owner, since motion by an object in the vicinity is detected, in this case motion of a thief. An urgent alarm is then sent when the car is moving, when the motion detector 1 detects that itself is moving. In this example, the motion detector is arranged for detecting both motion of surrounding objects 13 and if the motion detector device 1 itself is moved, but a motion detector 1 according to the present invention may be arranged only for one of these applications.

In the 3GPP Long Term Evolution standard (LTE) each base station, evolved Node B (eNB), of the radio access network continuously transmits cell-specific reference with each base station distinguishable from the other making that kind of network very suitable for the invention. The same idea is directly applicable to other non user terminal-specific reference signals transmitted by the eNBs such as MBSFN (Multi-Media Broadcast over a Single Frequency Network) reference signals, positioning reference signals, synchronization signals and CSI (channel state information) reference signals. In one embodiment, user terminal-specific reference signals intended for another user terminal may be used instead.

Figure 2:
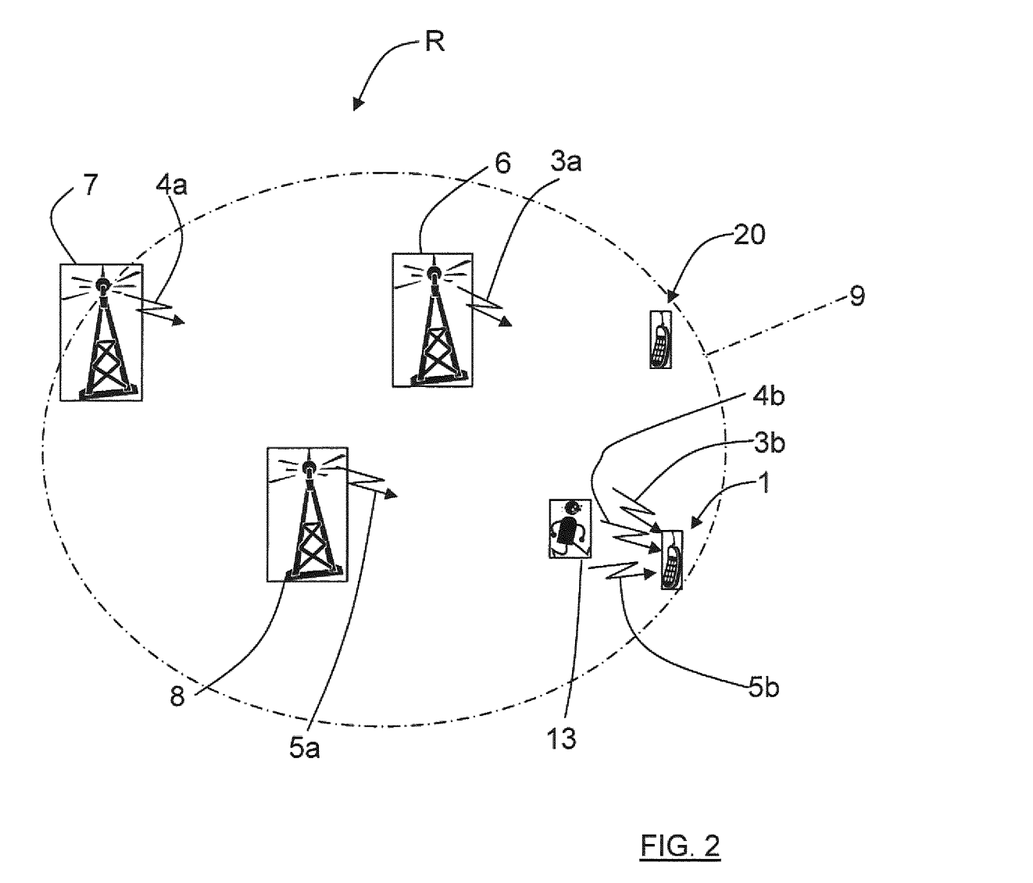
FIG. 2 shows a schematic view of three sources and a motion detector, where an object is close to the motion detector.

In a preferred version of the present invention with reference to FIG. 2, at least two wireless communication signal sources are transmitting signals, in this case a first base station 6, a second base station 7 and a third base station 8, which base stations 6, 7, 8 are spatially separated. These base stations 6, 7, 8 belong to a radio access network R, the radio access network R for example being of the type LTE.

The first base station 6 transmits a first transmitted signal 3a, the second base station 7 transmits a second transmitted signal 4a and the third base station 8 transmits a third transmitted signal 5a. The motion detector 2 receives a corresponding first received signal 3b, a second received signal 4b and third received signal 5b, where each received signal 3b, 4b, 5b has been influenced by the channel 9. In particular, an object 13 has a certain influence, which is detectable.

An advantage of receiving signals from several spatially separated wireless communication signal sources, such as these base stations 6, 7, 8, is that detected motion by either the object 13 or the motion detector 1 itself can be discriminated from channel variations due to changes in the environment far away in order to increase the reliability. Movement can be estimated by correlating the fluctuations of the different channels.

This is illustrated with reference to FIG. 6, where an object 13 is present in the vicinity of the third base station 8. By receiving signals 313, 4b', 513' from the first base station 6, the second base station 7 and the third base station 8, it is possible to detect that the fluctuations that occur are due to an object 13' in the vicinity of a wireless communication signal source, here the third base station 8b, since in this case the object 13' will only influence the channel 9 for the third received signal 5b, not any of the other received signals 3b'', 4b'.

In other words, using more general terms, with reference to both FIG. 2 and FIG. 8, the analyzing means 10 is arranged to correlate received signals 3b, 4b, 5b; 3b', 4b', 5b'; transmitted by at least two spatially separated wireless communication signal sources 6, 7, 8, enabling the analyzing means 10 to distinguish between surrounding objects 13 closer to the motion detector device 1 than any corresponding wireless communication signal source 6, 7, 8, and surrounding objects 13' closer to any corresponding wireless communication signal source 6, 7, 8 than the motion detector device 1.

Figure 6:
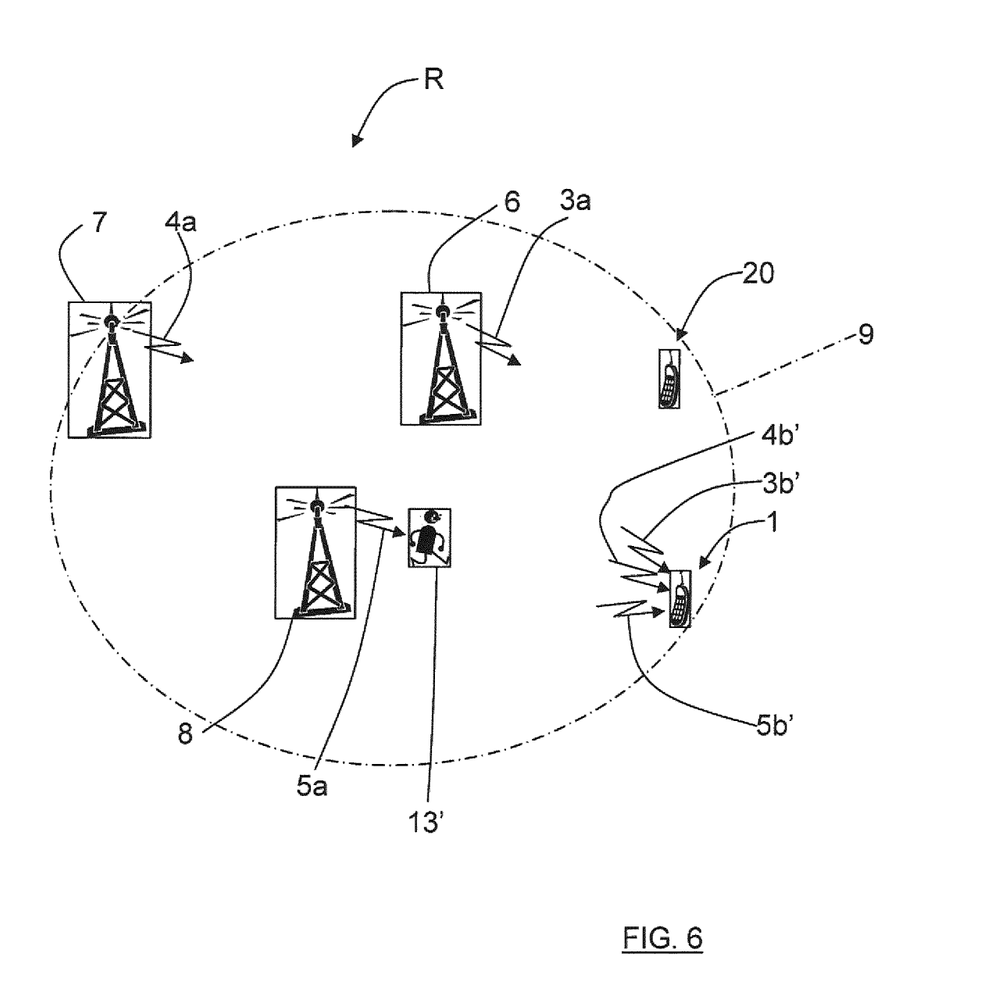
FIG. 6 shows a schematic view of three sources and a motion detector, where an object is close to a source.

Another possibility with reference to FIG. 6 is that at least one of the base stations 6, 7, 8 monitor a user terminal 20, and report the radio channel variations of the user terminal 20. Localization information is used to determine that the user terminal 20 is spatially separated from the motion detector 1.

If the user terminal 20 is spatially separated from the motion detector 1 and time variations of links between these and the mutual subset of the base stations 6, 7, 8 are correlated, it is likely that the channel variations are due to moving objects 13' in the environment close to a base station, in FIG. 6 the third base station 8.

In other words, using more general terms, at least one of the wireless communication signal sources 6, 7, 8 is arranged to provide information to the motion detector device 1 regarding received signal characteristics for at least one user terminal 20, said user terminal 20 being spatially separated from the motion detector device 1, the analyzing means 10 being arranged to correlate said information with the mutual subset of received electromagnetic signals 3b, 4b, 5b in order to distinguish between surrounding objects 13 closer to the motion detector device 1 than said wireless communication signal source 6, 7, 8, and surrounding objects 13' closer to said wireless communication signal source 6, 7, 8 than the motion detector device 1.

According to an example, this mode of operation may be transparent to the radio access network R. It may for example be implemented similar to a third-party application in a smartphone, communicating with a server over the radio access network R. According to another example, reports and measurements already supported by the standard are used, such as RSRP (Reference Signal Received Power), PMI (Precoder Matrix Indicator) and CQI (Channel Quality Indicator). In this case, the monitoring can be made transparent to the user terminals and/or motion detectors. The radio access network R could also feature the functionality to monitor multiple user terminals 1, 20 directly by analyzing the uplink reference signals transmitted by the user terminals 20. Stationary and moving user terminals can be separated through analysis of each estimated uplink channel response. As stated previously, a motion detector may be comprised in a user terminal.

Furthermore, by utilizing multiple antennas on transmitter and/or receiver it becomes possible to monitor parameters such as polarization and spatial direction, also increasing the confidence.

Figure 7:
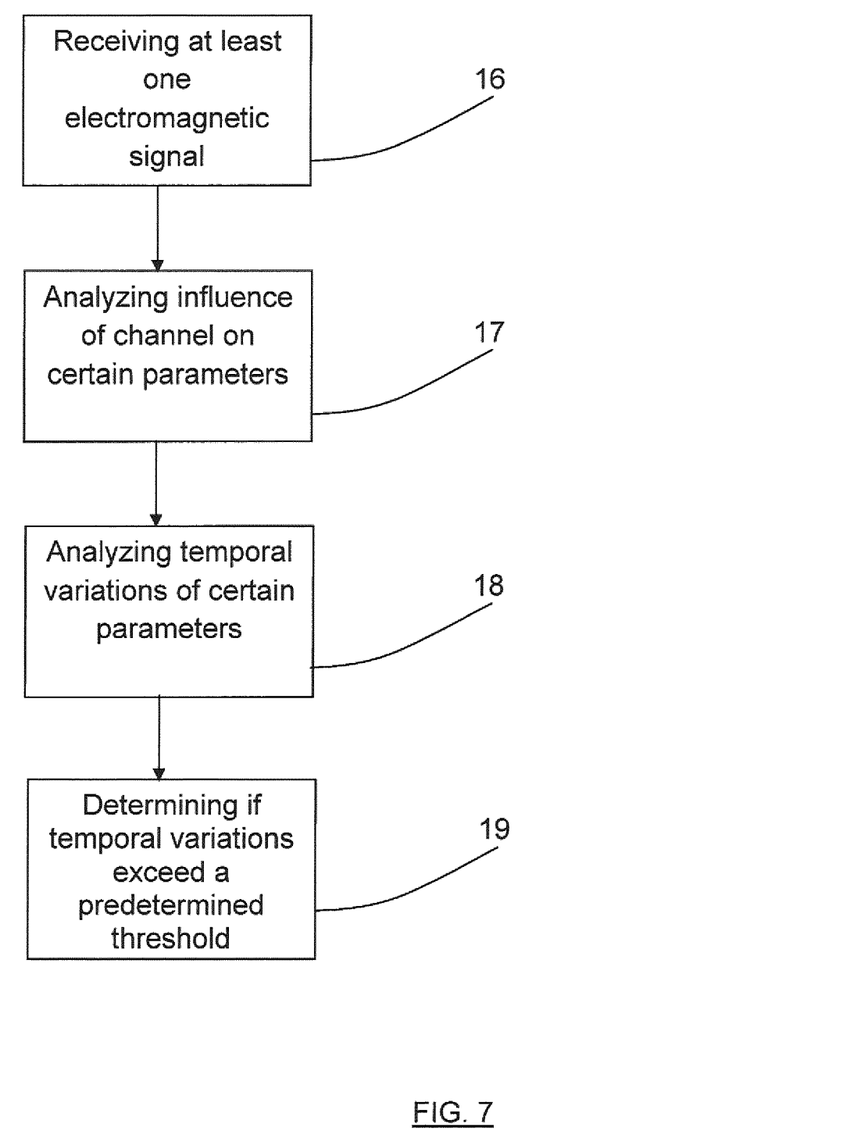
FIG. 7 shows a flow chart of a method according to the present invention.

With reference to FIG. 7, the present invention also relates to a method comprising the steps:

16: receiving at least one electromagnetic signal 3b, 4b, 5b, each received electromagnetic signal 3b, 4b, 5b being constituted by a transmitted electromagnetic signal influenced by a corresponding channel 9; 9a, 9b, 9c, each transmitted electromagnetic signal being transmitted by a corresponding source 6, 7, 8;

17: analyzing all components of the received signal to determine how certain parameters of each transmitted electromagnetic signal are influenced by each corresponding channel 9; 9a, 9b, 9c by using predetermined information regarding each transmitted electromagnetic signal;

18; analyzing temporal variations 14a, 14b, 14c, 14d; 15a, 15b, 15c, 15d of said certain parameters during a certain time; and 19: determining if said temporal variations 14a, 14b, 14c, 14d; 15a, 15b, 15c, 15d exceed a predetermined threshold.

The present invention is not limited to the examples above, but may vary freely within the scope of the claims.

The reference signals of LTE represent only one example and other solutions are possible. For example other systems such as GSM (Global System for Mobile communication), WCDMA (Wideband Code Division Multiple Access) and WiFi (Wireless Fidelity), and other signals such as for example CPICH (Common Pilot Channel) may be used.

The solution can be based on an existing macro network or an in-building network. No extra design criteria are added over already existing criteria. Motion detection is possible as long as there is basic service coverage. In one embodiment, dedicated infrastructure is used instead of already existing networks, possibly deployed in the free bands e.g. at 2.4 GHz.

A particular advantage of the present invention is that all components of the received signal are used for the analysis. If only the strongest component of the channel should be used, this component might be a line of sight component or a strong reflection that is not sensitive to motion of smaller objects in the surroundings such as a human being or an animal. A line of sight component is relevant for example in an indoor deployment or for a private outdoor open area such as the interior of a stadium.

By use of multiple sources such as base stations and UEs/devices, the risk of false alarms due to channel variations due to changes in the environment in the vicinity of base stations or far away from the movement detecting UE/device (e.g. trees moving in the wind) may be drastically reduced.

By using LTE-based reference signals, frequency domain analysis of the channel is straight forward. In one embodiment, the faded parts of the frequency domain representation of the channel are selected for analysis. These parts are subjects to much higher fluctuations due to changes in the environment thus suitable for higher detection sensitivity.

Each wireless communication signal source 7, 8 may be any form of suitable source.

Any type of fluctuation caused to the channel may be analyzed, not only the ones mention above.

Generally, the channel response need not be complex and is thus indicated only a channel response.

The invention claimed is:

1. A motion detector device comprising:
    a receiver operable to: (1) receive via a first channel region a first reference signal transmitted by a first transmission point and (2) receive via a second channel region a second reference signal transmitted by a second transmission point located remotely from the first transmission point, wherein the first channel region includes a region portion that is not included in the second channel region;
    an analyzer configured to:
        analyze the received first reference signal to determine how first certain parameters of the first signal are influenced by the first channel region,
        analyze the received second reference signal to determine how second certain parameters of the second signal are influenced by the second channel region,
        analyze temporal variation of said first certain parameters during a certain time, wherein the temporal variation of said first certain parameters differs based on a movement of the motion detector device and a movement of objects surrounding the motion detector device,
        analyze temporal variation of said second certain parameters during the certain time, wherein the temporal variation of said second certain parameters differs based on a movement of the motion detector device and a movement of objects surrounding the motion detector device,
        determine, based on the analysis of the temporal variations of said first and second certain parameters, whether an object is located in the region portion of the first channel region that is not included in the second channel region, and
        determine, based on the analysis of the temporal variations of said first and second certain parameters, whether the motion detector device has moved within the certain time.

2. The motion detector device according to claim 1, wherein the motion detector device is configured to detect one or more of motion of surrounding objects and if the motion detector device itself is moved.

3. The motion detector device according to claim 1, wherein the receiver is configured to receive at least two electromagnetic signals which have been transmitted by at least two spatially separated sources.

4. The motion detector device according to claim 3, wherein the analyzer is configured detect presence of an object and detect that the distance between the object and the receiver is: i) less than the distance between the object and the first transmission point and ii) less than the distance between the object and the second transmission point.

5. The motion detector device according to claim 1, wherein the receiver is configured to receive information from each source regarding received signal characteristics for at least one user terminal, wherein the user terminal is spatially separated from the motion detector device; and
    the analyzer is configured to correlate the information with all received electromagnetic signals in order to distinguish between surrounding objects closer to the motion detector device than said source, and surrounding objects closer to said source than the motion detector device.

6. The motion detector device according to claim 1, wherein the analyzer is arranged to form an average channel response for a number of channel responses during a certain time, where the analysis of temporal variation of said certain parameters during a certain time comprises analysis of variations around the average channel response.

7. The motion detector device according to claim 6, wherein the variations around the average channel response comprise variation of the amplitude of peaks and fades in the instantaneous channel responses, which variation is comprised in said temporal variations.

8. The motion detector device according to claim 6, wherein the variations around the average channel response comprise variation of the location of peaks and fades in the instantaneous channel responses, which variation is comprised in said temporal variations.

9. The motion detector device according to claim 1, wherein each source is in the form of a wireless communication source.

10. The motion detector device according to claim 1, wherein the analysis of temporal variation of said certain parameters during a certain time comprises analysis of Doppler shifts.

11. A method for detection of motion, the method comprising:
- receiving via a first channel region a first reference signal transmitted by a first transmission point;
- receiving via a second channel region a second reference signal transmitted by a second transmission point located remotely from the first transmission point, wherein the first channel region includes a region portion that is not included in the second channel region;
- analyzing the received first reference signal to determine how first certain parameters of the first signal are influenced by the first channel region;
- analyzing the received second reference signal to determine how second certain parameters of the second signal are influenced by the second channel region;
- analyzing temporal variations of said first certain parameters during a certain time, wherein the temporal variation of said first certain parameters differs based on a movement of a motion detector device and a movement of objects surrounding the motion detector device;
- analyzing temporal variations of said second certain parameters during the certain time, wherein the temporal variation of said second certain parameters differs based on a movement of the motion detector device and a movement of objects surrounding the motion detector device;
- determining, based on the analysis of the temporal variations of said first and second certain parameters, whether an object is located in the region portion of the first channel region that is not included in the second channel region; and
- determining, based on the analysis of the temporal variations of said first and second certain parameters, whether the motion detector device has moved within the certain time.

12. The method according to claim 11, wherein the method comprises one or more of detection of motion of objects surrounding a motion detector device, used for detection of said motion, and detection if the motion detector device is moved.

13. The method according to claim 11, wherein the method comprises receiving ambient electromagnetic radiation in the form of signals transmitted by at least two spatially separated sources.

14. The method according to claim 11, wherein the method comprises forming an average channel response for a number of channel responses during a certain time, where the step of analyzing temporal variations of said certain parameters during a certain time comprises analyzing variations around the average channel response.

15. The method according to claim 14, wherein said variations around the average channel response comprise amplitude variation of peaks and fades in the instantaneous channel responses, which variation is comprised in said temporal variations.

16. The method according to claim 14, wherein said variations around the average channel response comprise positional variation of peaks and fades in the instantaneous channel responses which variation is comprised in said temporal variations.

17. The method according to claim 11, wherein the step of analyzing temporal variations of said certain parameters during a certain time comprises analyzing Doppler shifts.

18. The motion detector device according to claim 6, wherein the analyzer is further arranged to form an instantaneous channel response, where the analysis of temporal variation of said certain parameters during a certain time comprises comparing the instantaneous channel response to the average channel response.

19. The motion detector device according to claim 18, wherein the analyzer is further configured to:
- based on the comparison of the instantaneous channel response to the average channel response, determine whether the instantaneous channel response is shifted with respect to the average channel response, and
- detect movement of the motion detector device itself as a result of the determination that the instantaneous channel response is shifted with respect to the average channel response.

20. The motion detector device according to claim 3, wherein the analyzer is further configured to detect presence of an object and detect that the distance between the object and the receiver is greater than at least one of: i) the distance between the object and the first transmission point and ii) the distance between the object and the second transmission point.

* * * * *

UNITED STATES PATENT AND TRADEMARK OFFICE
CERTIFICATE OF CORRECTION

PATENT NO. : 9,869,759 B2
APPLICATION NO. : 14/352967
DATED : January 16, 2018
INVENTOR(S) : Furuskog et al.

It is certified that error appears in the above-identified patent and that said Letters Patent is hereby corrected as shown below:

In Column 4, Line 25, delete "to" and insert -- term --, therefor.

In Column 4, Line 40, delete "15" and insert -- 15d --, therefor.

In Column 4, Line 44, delete "response," and insert -- response; --, therefor.

In Column 5, Line 54, delete "13" and insert -- 13' --, therefor.

In Column 5, Line 55, delete "313, 4b', 513'" and insert -- 3b', 4b', 5b' --, therefor.

In Column 5, Line 62, delete "3b"," and insert -- 3b', --, therefor.

In Column 5, Line 64, delete "FIG. 8," and insert -- FIG. 6, --, therefor.

In Column 7, Line 1, delete "18;" and insert -- 18: --, therefor.

In Column 7, Line 43, delete "7, 8" and insert -- 6, 7, 8 --, therefor.

In Column 8, Line 29, in Claim 4, delete "configured" and insert -- configured to --, therefor.

Signed and Sealed this
Third Day of April, 2018

Andrei Iancu
*Director of the United States Patent and Trademark Office*